US011247688B2

(12) United States Patent
Lerner

(10) Patent No.: US 11,247,688 B2
(45) Date of Patent: Feb. 15, 2022

(54) DRIVER SWAPPING

(71) Applicant: Toyota Motor North America, Inc., Plano, TX (US)

(72) Inventor: Emily S. Lerner, McKinney, TX (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 350 days.

(21) Appl. No.: 16/364,913

(22) Filed: Mar. 26, 2019

(65) Prior Publication Data

US 2020/0307610 A1    Oct. 1, 2020

(51) Int. Cl.
| | | |
|---|---|---|
| *B60W 40/09* | (2012.01) | |
| *G07C 5/08* | (2006.01) | |
| *H04L 9/32* | (2006.01) | |
| *G07C 5/00* | (2006.01) | |
| *G01C 21/34* | (2006.01) | |

(52) U.S. Cl.
CPC ......... *B60W 40/09* (2013.01); *G01C 21/3407* (2013.01); *G01C 21/3476* (2013.01); *G07C 5/008* (2013.01); *G07C 5/0841* (2013.01); *H04L 9/3236* (2013.01); *B60W 2540/22* (2013.01); *H04L 2209/38* (2013.01); *H04L 2209/84* (2013.01)

(58) Field of Classification Search
CPC ............ G07C 5/0841; B60W 2540/22; B60W 2040/0827; H04L 2209/38
See application file for complete search history.

(56) References Cited

U.S. PATENT DOCUMENTS

| | | | |
|---|---|---|---|
| 2002/0035421 A1 | 3/2002 | Warkentin | |
| 2010/0299177 A1* | 11/2010 | Buczkowski | G06Q 50/30 705/7.13 |
| 2018/0096175 A1 | 4/2018 | Schmeling et al. | |
| 2020/0126321 A1* | 4/2020 | Swearingen | G06F 21/602 |

* cited by examiner

*Primary Examiner* — Thomas G Black
*Assistant Examiner* — Tarek Elarabi
(74) *Attorney, Agent, or Firm* — Christopher G. Darrow; Darrow Mustafa PC

(57) ABSTRACT

The efficiency of commercial vehicle operations can be facilitated by using a blockchain. The blockchain can be used to track commercial operators and provide a logistical network for swapping operators. An operator identity for an initial operator of a vehicle and a route limitation indicating operator restrictions with respect to a route can be recorded in a blockchain database. Using a vehicle operation history retrieved from the blockchain database for the initial operator, a time frame for operation of the vehicle by the initial operator can be determined based on the route limitation and the vehicle operation history. An operator swap event at a swap location can be coordinated so that control of the vehicle can be transferred from the initial operator to a subsequent operator based on the time frame. The operator swap event and a subsequent operator identity can be recorded in the blockchain database.

16 Claims, 7 Drawing Sheets

DRIVER SWAPPING

FIELD

The subject matter described herein generally relates to commercial driving, and, more particularly, to commercial driver tracking and scheduling.

BACKGROUND

Many occupations can involve workers being on duty for extended periods of time and/or to work irregular shifts while on duty. However, extended period work and/or irregularly scheduled shifts can lead to worker fatigue, which can include reduced alertness, increased sleepiness, impaired performance or unsafe behavior. In addition, workers often suffer acute or chronic sleep deprivation, in combination with circadian time of day factors, which can exacerbate fatigue. Worker fatigue can create difficulties for transportation employees including commercial motor vehicle (CMV) operators, for example, truck operators, wherein driver fatigue can increase the risk of an accident.

SUMMARY

In one respect, the subject matter described herein is directed to a system for operator monitoring and swapping in commercial vehicles. The system can include one or more processors. The one or more processors can be programmed to initiate executable operations. The executable operations can include recording, in a blockchain database, an operator identity for an initial operator of a vehicle and a route limitation indicating one or more operator restrictions with respect to a route. The executable operations can also include, using a vehicle operation history retrieved from the blockchain database for the initial operator, determining a time frame for operation of the vehicle by the initial operator based on the route limitation and the vehicle operation history. The executable operations can include coordinating an operator swap event at a swap location to transfer control of the vehicle from the initial operator to a subsequent operator based on the time frame. The initial operator and the subsequent operator can be navigated to the swap location. The executable operations can further include recording, in the blockchain database, the operator swap event and a subsequent operator identity for the subsequent operator of the vehicle.

In another respect, the subject matter described herein is directed to a non-transitory computer-readable medium for operator monitoring and swapping in commercial vehicles. The non-transitory computer-readable medium can store instructions that, when executed by one or more processors, cause the one or more processors to perform various functions. For instance, the one or more processors can record, in a blockchain database, an operator identity for an initial operator of a vehicle and a route limitation indicating one or more operator restrictions with respect to a route. Further, the one or more processors can, using a vehicle operation history retrieved from the blockchain database for the initial operator, determine a time frame for operation of the vehicle by the initial operator based on the route limitation and the vehicle operation history. The one or more processors can coordinate an operator swap event at a swap location to transfer control of the vehicle from the initial operator to a subsequent operator based on the time frame. The initial operator and the subsequent operator can be navigated to the swap location. The one or more processors can record the operator swap event and a subsequent operator identity for the subsequent operator of the vehicle in the blockchain database.

In still another respect, the subject matter described herein is directed to a method for operator monitoring and swapping in a commercial vehicle. The method can include recording, in a blockchain database, an operator identity for an initial operator of a vehicle and a route limitation indicating one or more operator restrictions with respect to a route. The method can include using a vehicle operation history retrieved from the blockchain database for the initial operator, determining a time frame for operation of the vehicle by the initial operator based on the route limitation and the vehicle operation history. The method can include coordinating an operator swap event at a swap location to transfer control of the vehicle from the initial operator to a subsequent operator based on the time frame. The coordinating can include the initial operator and the subsequent operator being navigated to the swap location. The method can further include recording, in the blockchain database, the operator swap event and a subsequent operator identity for the subsequent operator of the vehicle.

DETAILED DESCRIPTION

Figure 1:
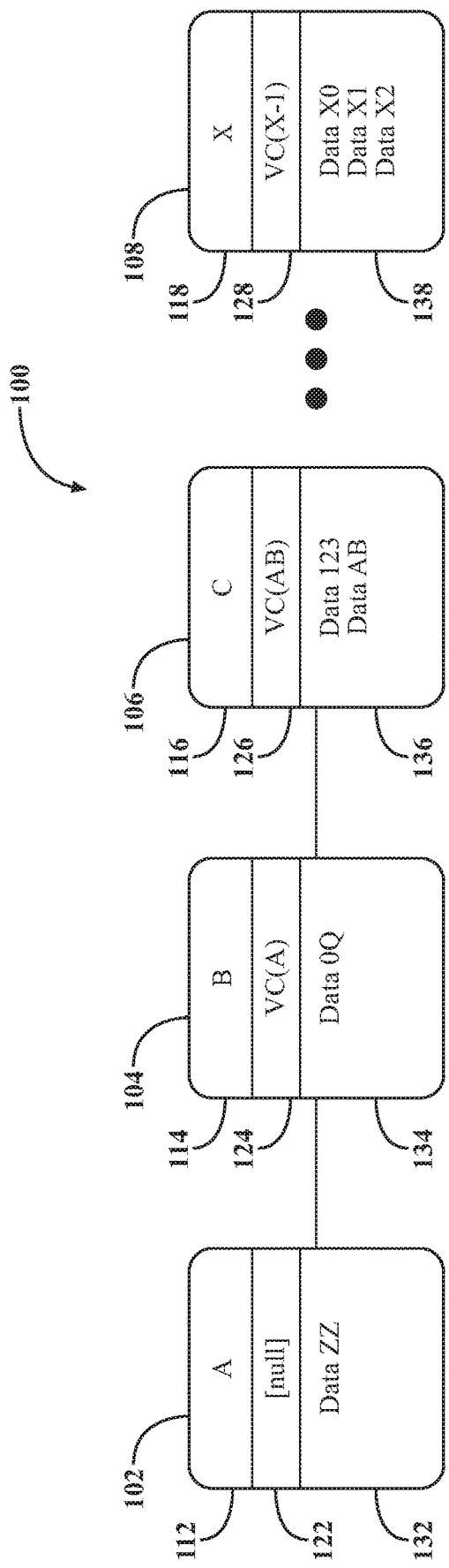
FIG. 1 is an example of a blockchain adaptable for use with an occupant verification system, according to some implementations.

The implementations disclosed herein generally relate to systems and methods for driver tracking and scheduling, such as for cargo or freight shipping. An operator monitoring system can use a blockchain to track commercial operators and provide a logistical network for swapping operators. Thus, the operator monitoring system can assist in monitoring driver swapping and improve the efficiency of delivering goods. The implementations disclosed herein can apply a trusted system for swapping operators to overcome difficulties which can occur from the legal limitations on driving time for commercial operators.

The present system implements a blockchain database as part of a computing device and/or a vehicle, such as within an electronic logging device (ELD) of a commercial vehicle. Additionally, each driver can have a verified identity on the blockchain. The operator monitoring system can use the verified identity to ensure the driver is trusted and to enforce time limits on driving. In one or more approaches as discussed herein, a blockchain can be a system that securely and immutably stores data. In general, blockchains can create a history of transactions in a series of blocks where each block includes a verification code. In some implementations, the verification code can be a hash. A hash is a mathematical summary of the previous block, and the process of producing a hash is called hashing. Hashing is a form of cryptographic security where a single unique string of a specific size is produced with relation to the information in the blockchain and the individual blocks respectively, making it difficult to reverse or decrypt. The hashes are one-way, meaning non-reversible. Thus, the hashes can make the blockchain secure against tampering.

The system can use the relationships between blocks and hashes to form a secure chain where subsequent blocks in a blockchain effectively secure prior blocks through storing the hash/identifier of the prior block while also incorporating the hash as an integral aspect of the current block. The blockchain database, in one approach, can store operator information within blocks of a blockchain, as well as tiered and correlated branches about associated vehicles, other operators, employers, load types, transit times, and other information relevant to commercial trucking and the logistics of driver swapping.

In general, the implementations described herein can include automatically routing and selecting rest stops for a driver according to compliance with driving time limits. Some implementations of the operator monitoring system can track the time the driver has been operating the vehicle, identify rest locations available (e.g., places with known available parking spots), and/or route the driver to ensure he or she reaches a location within the permitted time. In further aspects, the system can organize a driver swap. The driver swap can include routing the original driver to a swap location. The swap location is generally a place where the original driver can exit the vehicle or otherwise hand over control of the vehicle to a new driver. The new driver can then take over control of the vehicle, such as to have the new driver continue the route. In one or more implementations, the new driver can then take control of the vehicle and continue along a route. During this time, the original driver can rest for the required period of time, such as at a contracted location (e.g., Airbnb, hotel, etc.).

The blockchain database can facilitate this swapping among a pool of operators. The operator monitoring system can maintain a driver history in the blockchain database. The blockchain database can create a generally immutable record of the driver history. Through this immutability, the operator monitoring system can ensure trust regarding the information received about the driver history. During rest time of the original driver, a second commercial vehicle can be routed to the location of the original driver. The second commercial vehicle can arrive during an on-call timeframe so that the original driver is available to take over for a driver of the second commercial vehicle, such as at the end of the rest period for the original driver. The driving monitoring system can continue in this way to provide for a succession of operators for a vehicle, while allowing each of the succession of operators to remain stationary for rest periods. The implementations disclosed herein are described in greater detail with reference to the figures below.

FIG. 1 depicts an example of a blockchain 100, according to some implementations. Each subsequent block in the blockchain 100 generally includes a block ID, verification code, and a data field. The blocks, as identified by the block ID, can include a data field. The data field can hold the data elements, such as the fuel measurements, ride histories, payment information, user experience information, and other information of the occupant verification system. Once the system has added the desired data for that block, the system generates a verification code from the data in the block and one or more subsequent blocks. The system can generate the verification code from data in the block, such as data in the data field. The verification code thus represents the data as stored, which makes that data unable be changed or altered without the alteration being recognized.

The blockchain 100 can start with block A 102. Block A 102 can include a block ID 112, a verification code field 122, and/or a data field 132. The block ID 112 can be a sequence which identifies the block A 102. The block ID 112 can be a unique sequence with respect to the other blocks in the blockchain 100. The block A 102 can further include the verification code field 122. The verification code field 122 can store a verification code. The verification code can be a unique sequence which is mathematically generated using the previous block as an input. The verification code can be a hash, chameleon hash, or others which represent the data as stored. The verification codes presented are for exemplary purposes and are not intended to be limiting of possible size or permutations of the verification sequences in the blocks of the blockchain 100. As the block A 102 is the first block in the blockchain 100, the verification code field 122 can be empty. In further examples, the verification code field 122 can have a verification code generated based on the data only in the block A 102 or using other identifying factors, such as time stamp or data origin. The data field 132 can be a generic sequence of digital input from a variety of sources. The data field 132 can further be of varying sizes, as limited by the block size of the blockchain 100, including being empty.

Block B 104 can include a block ID 114, a verification code field 124, and/or a data field 134. The block ID 114 can be substantially similar to the block ID 112. The block B 104 further has a verification code VC(A), in the verification code field 124. The verification code can be generated from the content of previous block A 102, which can serve as an input for generation of the verification code. The content of block A 102 used in the determination of the verification code VC(A) can include any or all of the fields within block A 102, such as data ZZ in the data field 132, the [null] verification code in the verification code field 122, and/or the block ID 112. The data field 134 of the block B 104 can be used to store any type of data. For example, the data field 134 can hold account data, version data, links, pointers, archived data, currency value, personal data, contract terms, transaction data, documents, other data, or combinations thereof.

The blocks of the blockchain 100 can be locked to one another via the verification codes. In one sense, the blocks are locked to one another with respect to the verification code, because the verification codes in each of the blocks are generated including the content in one or more of the previous blocks at the time the verification code was generated. As such, modifications to a previous block after a current block is added will create evidence of modification. Specifically, the change will be inconsistent with the verification code as generated using the previous data and stored in the current block. Hence, the content of the respective block is locked once a subsequent block with a generated verification code is added to the blockchain 100.

Block C 106 can include a block ID 116, a verification code field 126, and/or a data field 136. The block ID 116 can be substantially similar to the block ID 112. In this example, the data field 136 can include Data 123 and Data AB. The block C 106 can further have a verification code VC(AB) in the verification code field 124. The verification code can be generated from the content of previous block A 102, the previous block B 104, and/or combinations thereof. The content of block A 102 and block B 104 used in the determination of VC(AB) can include any or all of the fields within block A 102 and block B 104. In further implementations, the verification code in the verification code field 126 can include the previous block (e.g., block B 104) and any further information desired (e.g., any elements of block A 102).

Block X 108 can represent all further blocks in the example blockchain 100. Block X 108 can include a block ID 118, a verification code field 128, and/or a data field 138. Block X 108 can be substantially similar to block A 102, block B 104, block C 106 or combinations thereof. The verification code for the verification code field 128 can be generated from the content of previous block A 102, the previous block B 104, the previous block C 106, other blocks, or combinations thereof. The verification code can be generated using data from some blocks while skipping other blocks (e.g., a verification code generated using data ZZ from block A 102, Data AB and the verification code VC (AB) from block C 106, and no data from block B 104). Fields in the blocks (e.g., blocks 102, 104, 106, and 108) that are not used to determine the verification code in subsequent blocks may not necessarily be protected by the blockchain 100. For example, these fields can be modified without creating coding inconsistencies between the blocks. In addition, if the verification code field (e.g., verification code fields 122, 124, 126, and 128) is not used when determining the verification code of the next block of the character string, the blockchain 100 does not necessarily guarantee the coding consistency between the above blocks, because the unsafe verification code can be modified without generating evidence of inconsistency.

Thus, in various implementations, at least one secure portion of the verification code field and the data field of the block can be used to determine the verification code for the next block (e.g., the subsequent block in the blockchain). In this example of a blockchain, the content of block B 104 can be locked once block C 106, which contains a verification code generated using VC(AB) in verification code field 126, can be added to the blockchain 100. As a result, the content of block A 102, which was locked by block B 104, can be further secured by block C 106 because block C 106 prevents block B 104 from being changed without producing evidence of tampering. Thus, the blockchain 100 can be used to produce a secure database of the collected data in blocks which are tamper resistant.

Figure 2:
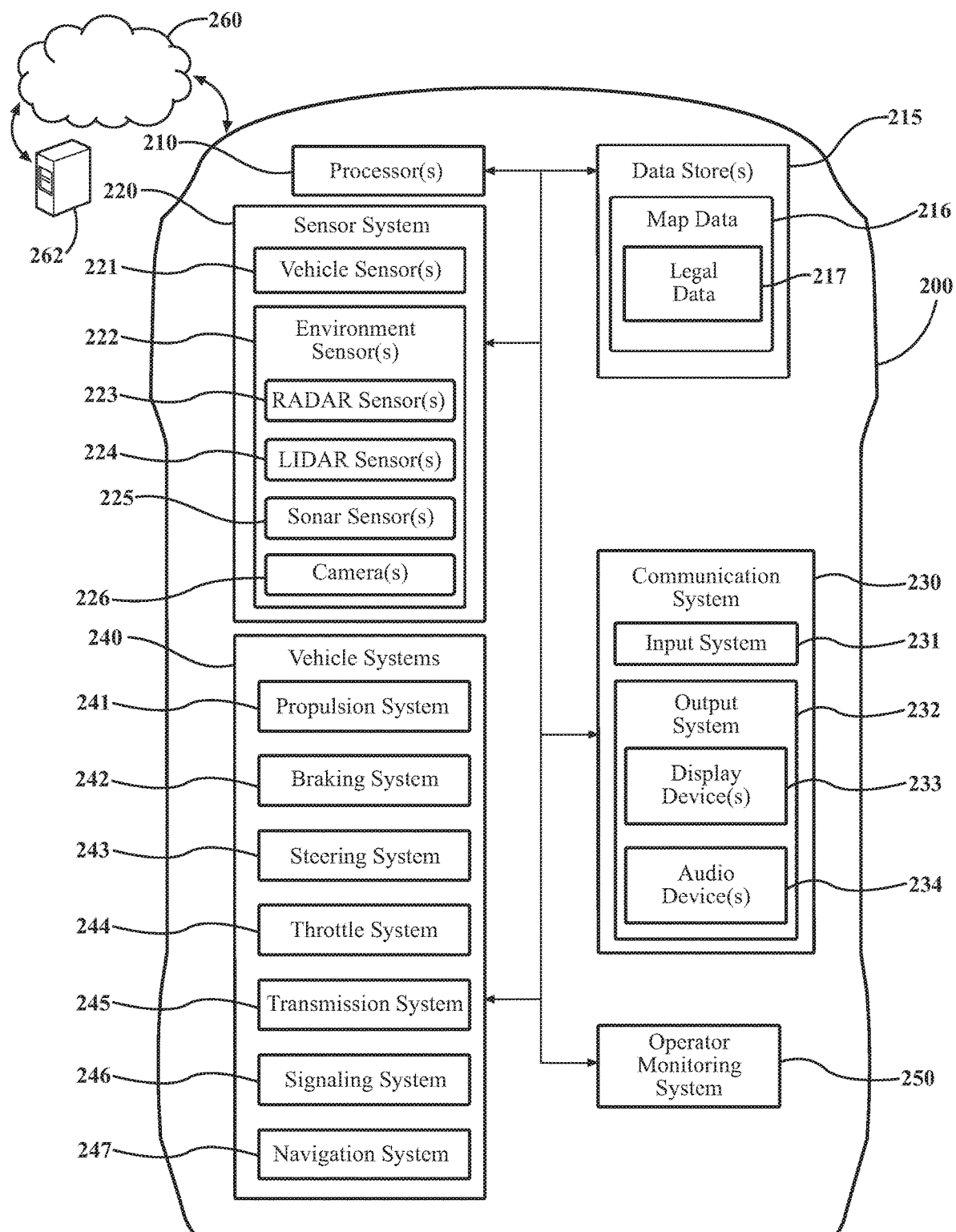
FIG. 2 is a block diagram illustrating one embodiment of a vehicle incorporating an operator monitoring system, according to implementations described herein.

Referring to FIG. 2, an example of a vehicle 200 is illustrated, according to one or more implementations. As used herein, a "vehicle" is any form of motorized transport. In one or more implementations, the vehicle 200 can be an automobile. In some implementations, the vehicle 200 may be any other form of motorized transport that, for example, can operate autonomously, semi-autonomously, or manually by an in-vehicle operator. The vehicle 200 can include an operator monitoring system 250 or capabilities to support or interact with the operator monitoring system 250, and thus benefits from the functionality discussed herein.

The vehicle 200 can also include various elements. The vehicle 200 can have any combination of the various elements shown in FIG. 2. Further, the vehicle 200 can have additional elements to those shown in FIG. 2. In some arrangements, the vehicle 200 may be implemented without one or more of the elements shown in FIG. 2. While the various elements are shown as being located within the vehicle 200 in FIG. 2, it will be understood that one or more of these elements can be located external to and/or remote from the vehicle 200. Further, the elements shown may be physically separated by large distances. Some of the possible elements of the vehicle 200 are shown in FIG. 2 and will be described along with subsequent figures. However, a description of many of the elements in FIG. 2 will be provided after the discussion of FIGS. 3-6 for purposes of brevity of this description.

In implementations described herein, the vehicle 200 can be in communication with a computing device, such as a server 262 through a network 260. The vehicle 200 or other device being in communication with the computing device refers to any forms of direct or indirect communication between the computing device and the vehicle 200, including direct wired communication, communication through one or more intermediary computing devices, communication through the cloud (e.g., the network 260), or combinations thereof. The communication can be performed through the use of a variety of wired or wireless networks. In some implementations, the computing device can be integrated into the vehicle 200, such as an embedded system. The computing device can include the operator monitoring system 250 and/or components thereof or otherwise be configured to perform the methods and other functions as disclosed herein.

Figure 3:
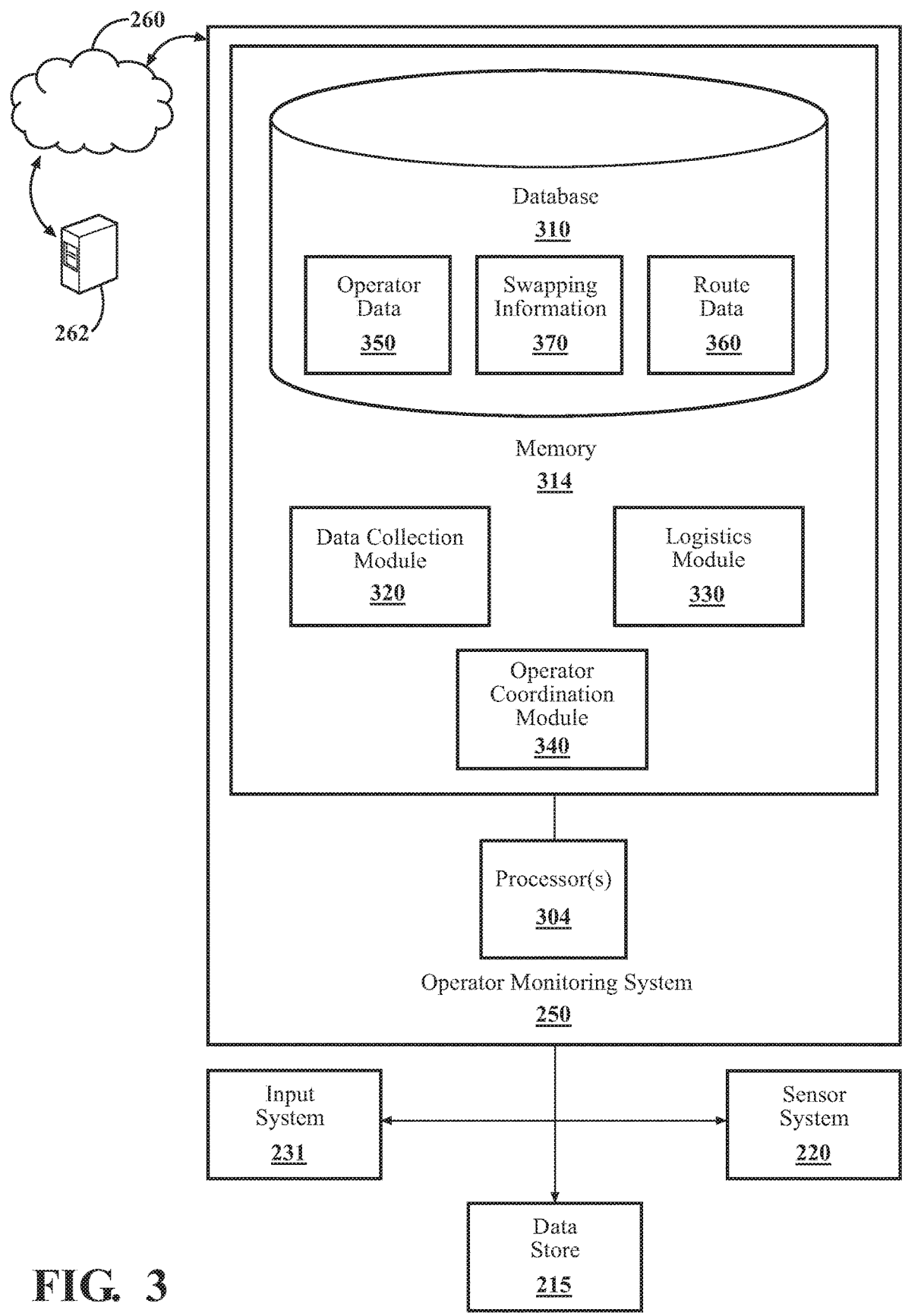
FIG. 3 is an operator monitoring system for operator monitoring and swapping in commercial vehicles, according to one or more implementations.

The operator monitoring system 250 is described in greater detail with reference to FIG. 3. The operator monitoring system 250 can function for operator monitoring and coordinating one or more operator swap events in a vehicle. The vehicle or components thereof, can be substantially similar to the vehicle 200, described with reference to FIG. 2. The operator monitoring system 250 can include one or more modules to perform the functions described herein, such as to collect information about the vehicle route and the operator, determine regulatory and personal limits of the operator, establish a timeframe for operating the vehicle, and coordinate an operator swap at a rest location. The operator monitoring system 250 can be operatively connected to a processor 304. "Operatively connected" can include any form of direct and indirect connections, including connections without direct physical contact. The processor 304 can be substantially similar to the processor 210, described with reference to FIG. 2. In one or more implementations, the processor 304 can be any available processor for a computing device. In one or more further implementations, the operator monitoring system 250 can include a separate processor from the processor 304, the processor 210 of the vehicle 200, or the operator monitoring system 250 can access the processor 304 or the processor 210 through a data bus or another communication path.

In one or more implementations, the operator monitoring system 250 can include a memory 314. The memory 314 can be substantially similar to and/or operate in conjunction with the data store 215, described with reference to FIG. 2. In some implementations, the operator monitoring system 250 can communicate with the data store 215 to perform one or more of the functions described herein. The memory 314 can store one or more modules for use as part of the operator monitoring system 250, such as a data collection module 320, a logistics module 330, and/or an operator coordination module 340. The memory 314 can be any suitable form of memory, including a RAM, ROM, a hard disk drive, a flash memory, or other suitable memory for storing the data collection module 320, the logistics module 330, and/or the operator coordination module 340. The data collection module 320, the logistics module 330, and/or the operator coordination module 340 are, for example, computer-readable instructions that when executed by the processor 304, cause the processor 304 to perform the various functions disclosed herein.

The memory 314 can further include a database, such as a database 310. The database 310 can include data or information for use as part of the implementation of the operator monitoring system 250 described herein. The database 310 can include data or information collected, formulated, processed, derived, or manipulated from a variety of sources. In one or more implementations, the database 310, components thereof, or portions thereof can be stored as part of a blockchain database. The blockchain database can be a file storage system that includes blocks storing selected data (e.g., requests, histories, etc.) and identifiers of the blocks (e.g., hashes). The blocks and the related hashes can be configured such that the blockchain database can be shared across the network while maintaining the integrity of the said database. The blocks of the blockchain database can be discrete blocks of data including information about the one or more operators, the one or more vehicles, one or more operator swaps, vehicle routes, or other information related to the transportation of goods or vehicle operators. When the operator monitoring system 250 adds a block to the blockchain, the block can receive a verification code. The operator monitoring system 250 can include instructions to create a verification code for the block as a secure mechanism for identifying the particular block and preventing changes to previous blocks. Thus, the verification code (e.g., hash) uniquely identifies the block and is secure in that the verification code function employed by the system is one-way (i.e., irreversible). The new block can then be distributed to one or more devices throughout the network for incorporation in the blockchain database and for later use.

In one or more further implementations, the operator monitoring system 250 can include an operator data 350, a route data 360, and a swapping information 370. The operator data 350 can generally include information and/or data collected about an operator of the vehicle. In some implementations, the operator data 350 can be operator-centric, meaning that the information revolves around a specific operator and the various contacts that the operator makes as relevant to the operator monitoring system 250. In further implementations, the operator data 350 can be vehicle-centric, meaning that the information revolves around a specific vehicle and the operators which interacted with the vehicle. Some examples of the operator data 350 can include operator identity, a number of hours traveled, operator skill level, and planned routes related to the vehicle.

The route data 360 can generally include information and/or data collected about one or more routes and/or one or more destinations for a vehicle. The route data 360 can account for a variety of factors related to transit of goods, such as in a commercial vehicle. Some examples of the route data 360 include a selection of various routes, possible issues with said routes (e.g., the level of incline, effects on heavy loads, possible hazards, etc.), time required for each route, refueling locations, rest locations available, and/or other route-related information or data as desired.

The swapping information 370 can include information regarding one or more operator swap events. In one or more implementations, the swapping information 370 can include information which coordinates between the operator data 350 and the route data 360. Some examples of the swapping information 370 can include a selection of one or more operators which are good matches for an operator swap event, swap locations and/or rest locations, swap timing, and other helpful information or data related to swapping or exchange of an operator for the vehicle.

The operator monitoring system 250 can begin with instructions from the data collection module 320. The data collection module 320 of the operator monitoring system 250 can generally include instructions to collect data related to the operators and the vehicles, for use in monitoring the operators and coordinating swap events. The data can be collected from a variety of sources, such as from the operator, preexisting in the blockchain database, secondary sources, or others. The data can then be recorded as part of an operator identity for an initial operator of a vehicle. As well, the data can include a route limitation indicating one or more operator restrictions with respect to a route in a blockchain database. The data collection module 320 can generally include instructions that function to control the processor 304 to record an operator identity for an initial operator of a vehicle and a route limitation indicating one or more operator restrictions with respect to a route in a blockchain database. The vehicle can be a commercial vehicle, such as a semi-trailer truck (also commonly referred to as "18-wheeler" or a "semi").

In some implementations, the vehicle can further include an electronic logging device (ELD). The ELD can be an electronic component that can be operatively connected to a commercial motor vehicle (CMV), such as at the engine. An ELD can monitor a vehicle's engine to capture data on vehicle operation. Examples of data captured by the ELD can include whether the engine is running, whether the vehicle is moving, miles that were driven, and duration of engine operation. The ELD can be used to automatically record driving hours, such as for compliance with the rules regulating commercial driving. The rules regulating commercial driving are a variety of rules which restrict or affect the driving times and driving hours of commercial drivers. These rules can be implemented by the contracting party for delivery of goods, a trucking company, federal authorities, or others. One such example of these rules is the Hours of Service (HOS) regulations, as issued by the Federal Motor Carrier Safety Administration (FMCSA). The HOS generally governs the working hours for operators of CMVs in the US.

The data collection module 320 can further include instructions to receive or collect an operator identity. The data collection module 320 can be initiated by a detection, an interaction, or combinations thereof. In one or more implementations, the data collection module 320 can interact with one or more sensors to determine when an operator has entered the vehicle. Sensors used in implementations described herein can be part of the sensor system 220, described with reference to the vehicle 200 of FIG. 2. One or more of the sensors can be directed at the cabin such that data collected is related to the operator. In one or more implementations, the data collected by the data collection module 320 can include biometrics, facial recognition, eye tracking, and others. In this implementation, the data collection module 320 can include instructions to determine the identity of the operator using the data collected through the one or more sensors. In further implementations, the data collection module 320 can receive an input from the operator, such as a selection on a touchscreen, the presentation of an identification (ID) device, the use of a tracked key dongle (e.g., encoded identification), or other operator-specific indications. The input can be provided through the vehicle, such as through the input system 231 of the vehicle 200.

The data collection module 320 can further include instructions to verify the operator identity, such as to prevent the bypassing of rules and regulations. In one or more implementations, the data collection module 320 can include instructions to compare a unique identifier to the operator history information, as stored in the blockchain. In some implementations, the operator history information can be stored as part of the operator data 350, in the database 310. The unique identifier, in one or more implementations, can be a specific sequence of characters, the results of an algorithm, combinations thereof, or other pieces of data, which can be used to reduce or eliminate improper identification of operators. Unique identifiers can be permanently established and/or change over time, as desired.

The operator identity information and related data can then be stored as part of the operator data 350, in the database 310. The operator identity information and related data can include information about both the operator and the vehicle, such as identifying information about both the operator and the vehicle. In some implementations, the operator data 350 can be stored as part of the blockchain database. In some examples, the operator data 350 can include instructions to broadcast the operator identity information and related data to a plurality of devices, such as a plurality of vehicles, which are part of the blockchain network. The operator data 350 can then incorporate the operator identity into a block. The operator data 350 can then be incorporated into a block as part of the blockchain, where the resulting block receives a generated verification code and can then be communicated to all devices on the blockchain network. As the verification code is based on the accumulated data from selected portions of the blockchain, the validity of the block can be verified by other recipients in the network before being incorporated in the blockchain database.

The data collection module 320 can further include instructions to determine a route and route limitation(s). The vehicle route can be the path that the vehicle is expected to travel, as oriented to a map. The vehicle route can include one or more segments, such as for refueling or rest stops. The route of the vehicle can be established based on distance, and conditions in traffic control, between the destination and the origin for the vehicle. In one or more implementations, the operator can select from a plurality of routes based on these or other factors. The route limitation(s) can be one or more limits set by the rules regulating commercial driving in relation to the route, as described above. In one or more implementations, the route limitations can include limitations on driving time, limitations on time of operation (e.g., time of day or night), driving interval limitations, limitations with relation to stressful driving, or others which can affect the safety of commercial driving. The data collection module 320 can then, through instructions as received by the processor 304, record the route limitation as part of the route data 360 in the database 310. The route limitations can be incorporated as part of the blockchain database, as described above with reference to the operator identity information.

The data collection module 320 can further include instructions to retrieve a vehicle operation history from the blockchain database for the initial operator. The vehicle operation history can include information and data regarding one or more operators of the vehicle. The vehicle operation history can be limited to a specific timeframe or cover the entire history of the vehicle. Some examples of information or data which may be included in the vehicle operation history can include operator identity, total hours of operation, hours of operation by a specific operator, and specific timeframes of operation by a specific operator. In one or more implementations, the vehicle operation history can be stored as part of the operator data 350 in the database 310.

In one or more further implementations, the data collection module 320 can further include instructions to collect alertness information about the initial operator, the alertness information being applied to modify the timeframe. Alertness information can generally relate to the alertness of the operator during vehicle operation. In one or more implementations, alertness information can be derived from operator gaze and eye tracking. Operator gaze and eye tracking can be derived from numerous sources, such as from one or more sensors in the vehicle. In one or more implementations, the data collection module 320 can incorporate the operator identity information, the alertness information, the route limitation, and the vehicle operation history in determining timeframes and continuance of the route by the operator.

The logistics module 330 of the operator monitoring system 250 can provide guidance for the coordination of the operators and the related routes for one or more operator swap events. The logistics module 330 can generally include instructions that function to control the processor 304 to use a vehicle operation history retrieved from the blockchain database for the initial operator, determine a time frame for operation of the vehicle by the initial operator based on the route limitation for the route and the vehicle operation history. The time frame can be the length of time that the operator can continue operation of the vehicle before resting, based on legal requirements and capabilities of the operator. The logistics module 330 can include instructions to determine the time frame based on one or more limiting conditions, such as the route limitation, alertness information, and the vehicle operation history. In one or more implementations, the logistics module 330 can include instructions to determine a plurality of time frames for the same route. The plurality of time frames can be configured to separate the route into segments for one or more operators. The time frame(s) can further account for the distance between rest locations, possible operator swap events, and vehicle refueling. The time frames can be adjusted for operator-specific factors, such as the alertness information described above.

The logistics module 330 can further include instructions to establish an operator swap event for the initial operator based on the timeframes. The operator swap event can be the exchange of an initial operator to a subsequent operator in a vehicle and the related logistics around the exchange. The operator swap event can include a selected location as well as a determination of which subsequent operator is best suited for the exchange with the initial operator. The related logistics to the operator swap event can include determination of location (e.g., a rest location) for the exchange to occur, timing of the event (e.g., to minimize downtime both for the initial operator as well as the subsequent operator), considerations for refueling, further related swap events (e.g., such as to get the initial operator back on the road after a rest period), and others.

The logistics module 330 can include instructions to reference the operator data 350 and/or the route data 360 together with the related details for the operator swap event. In one or more implementations, the operator monitoring system 250 and/or the logistics module 330 can be implemented in one or more of the vehicles. The logistics module 330, as implemented in the vehicle, can coordinate with other implementations to assure proper timing for the operator swap event. The logistics module 330 can include instructions to predict one or more intervening events, such that the operator swap event occurs with desired timing and/or an appropriate subsequent operator is selected for the exchange with the initial operator.

The logistics module 330 can further include instructions to retrieve a vehicle operation history from the blockchain database for one or more subsequent operator candidates. In one or more embodiments, the logistics module 330 can include instructions to review subsequent operator candidates for exchange with the initial operator. The subsequent operator candidates can be selected based on a variety of factors, such as proximity, availability for the entire route or portion thereof, experience level, the timing of later swap events, or others. The subsequent operator candidates can be grouped or otherwise selected based on the predicted range. In further embodiments, the logistics module 330 can further include instructions to offer optional routes allowing an operator to become one of the subsequent operator candidates for the operator swap event with the initial operator. The logistics module 330 can allow input from the initial operator and/or one or more subsequent operator candidates regarding the operator swap event. In this way, the initial operator and/or the one or more subsequent operator candidates can choose whether to be involved in a particular operator swap event.

The logistics module 330 can then provide for the selection of the subsequent operator from the one or more subsequent operator candidates based on the vehicle operation history. In determining the variety of factors, the logistics module 330 can include instructions to reference the vehicle operation history of each of the one or more subsequent operator candidates. The vehicle operation history for the subsequent operator candidates can be substantially similar to the vehicle operation history for the initial operator. The vehicle operation history for the subsequent operator candidates can include vehicles of within a variety of time frames, the time period until the next mandatory rest for the subsequent operator candidates, or others which are helpful in determining a subsequent operator from the candidates.

The logistics module 330 can further include instructions to select the subsequent operator from the one or more subsequent operator candidates by comparing route limitations to a desired work frequency and a shift destination for each of the subsequent operator candidates. Desired work frequency can be a measure of how many hours the operator would like to work, such as a number of operating hours per week. The desired work frequency can then be used to set an upper boundary of hours for coordinating the exchange of operators and determining which candidate is best suited to a route or a particular operator swap event.

The logistics module 330 can further include instructions to provide a selection of possible rest locations to the initial operator, wherein the initial operator selects the rest location. In one or more implementations, the initial operator can require a specific location for the rest required in the regulations. The rest location can be used for the operator swap event such that the initial operator has a place to rest. In some implementations, the logistics module 330 can further include instructions to present a selection of rest locations where the operator swap event can occur. The logistics module 330 can present the selection of rest locations in a variety of fashions, such as visually (e.g., through a display or an augmented reality screen), audibly (e.g., through one or more speakers in a vehicle), or others. The logistics module 330 can then present the selected rest location as the operator swap event location. In some implementations, the logistics module 330 can provide one or more options for the operator swap event to the one or more subsequent operator candidates, such as to allow the one or more subsequent operator candidates to agree with the selection, request a different selection, or withdraw as a candidate.

The operator swap event and related swapping data can be stored as part of the swapping information 370 in the database 310. In some implementations, the swapping information 370 can be stored as part of the blockchain database. Here, the operator swap event and related swapping data can be added to a block. The block can further include a combination of other data points up to a maximum block size or the blocks can be restricted to the operator swap and the related swapping data. The block can then be hashed to create a mathematical summary of the data. The mathematical summary can be limited to the data within the individual block, include all data added to the blockchain database, or other permutations. The new block and the hash can then be forwarded to other devices on the network, where the new block can be verified and added to the blockchain database appropriately.

The operator coordination module 340 of the operator monitoring system 250 can provide navigational guidance and information to the operators and/or the vehicles in fulfillment of the operator swap events. The operator coordination module 340 can generally include instructions that function to control the processor 304 to coordinate an operator swap event at a swap location to transfer control of the vehicle from the initial operator to a subsequent operator based on the time frame, the initial operator and the subsequent operator being navigated the swap location. As routes for each of the operators may differ, the operator coordination module 340 can include instructions to modify the routes based on of the operator swap event, such that the routes of the initial operator and the subsequent operator overlap at an appropriate time frame for the operator swap event. In some implementations, the operator coordination module 340 can, through instructions to the processor 304, create one or more modifications to the route of the initial operator and/or the subsequent operator. The one or more modifications can include the initial operator and/or the subsequent operator being directed toward a rest location. The directions can include receiving modifications of the route on a navigation device, audible cues or directions (e.g., being provided a new address), new roads and/or travel speeds (e.g., to optimize fuel consumption and adjust timing of arrival), or other factors which can be used to affect the overlap in the routes.

After arriving at the swap location and/or the rest location, the initial operator and the subsequent operator can then transfer operation of the vehicle to the subsequent operator. Transferring operation of the vehicle can include one or more mechanisms of confirming the identity of the subsequent operator and transferring physical control of the vehicle to the subsequent operator. In one or more implementations, the identity of the subsequent operator can be confirmed in a substantially similar manner to that of the identity of the initial operator, such as through the use of a physical ID and/or unique code. Transferring physical control of the vehicle generally includes transferring possession of the vehicle (e.g., allowing entry into the vehicle) and transferring the control elements of the vehicle (e.g., keys or a key dongle). Once the operator swap event is complete, the initial operator can continue on with the mandatory break or rest period.

The operator coordination module 340 can further include instructions to record the operator swap event and a subsequent operator identity for the subsequent operator of the vehicle in the blockchain database. Once the operation of the vehicle has been transferred to the subsequent operator, the operator coordination module 340 can then record the transfer and the identity of the subsequent operator as part of a block. In some implementations, the subsequent operator block can then be added to the blockchain database, such as a block which can be incorporated into the swapping information 370. The subsequent operator block can further include a generated verification code. The subsequent operator block can then be forwarded to other members of the network for verification, as described above with reference to previous blocks in the blockchain database. Once the information and the verification code have been verified, the block can then be added to the respective copies of the blockchain, as controlled by the other members in the network.

The operator coordination module 340 can further include instructions to establish an operator swap event between the initial operator and an operator of a second vehicle after the rest period. In further implementations, the operator coordination module 340 can be involved in the further coordination of operator swap events, such as after a rest period for the original operator. Once the rest period is complete, the original operator can then be ready to continue with the operation of another vehicle.

The operator coordination module 340 can further include instructions to coordinate a vehicle to the rest location for a second operator swap event. As described above, the logistics module 330 can include instructions to coordinate the second operator swap event, including providing the routing and options to one or more second operators according to the vehicle operator histories available. The operator coordination module 340 can then organize a route for the second operator accordingly. After arriving at the rest location, the second operator can then transfer operation of the second vehicle to the original operator (who, in relation to the second vehicle, is the subsequent operator). Thus, the operator coordination module 340 can help the original operator maintain legal obligations regarding rest, while simultaneously minimizing operator downtime.

Figure 4:
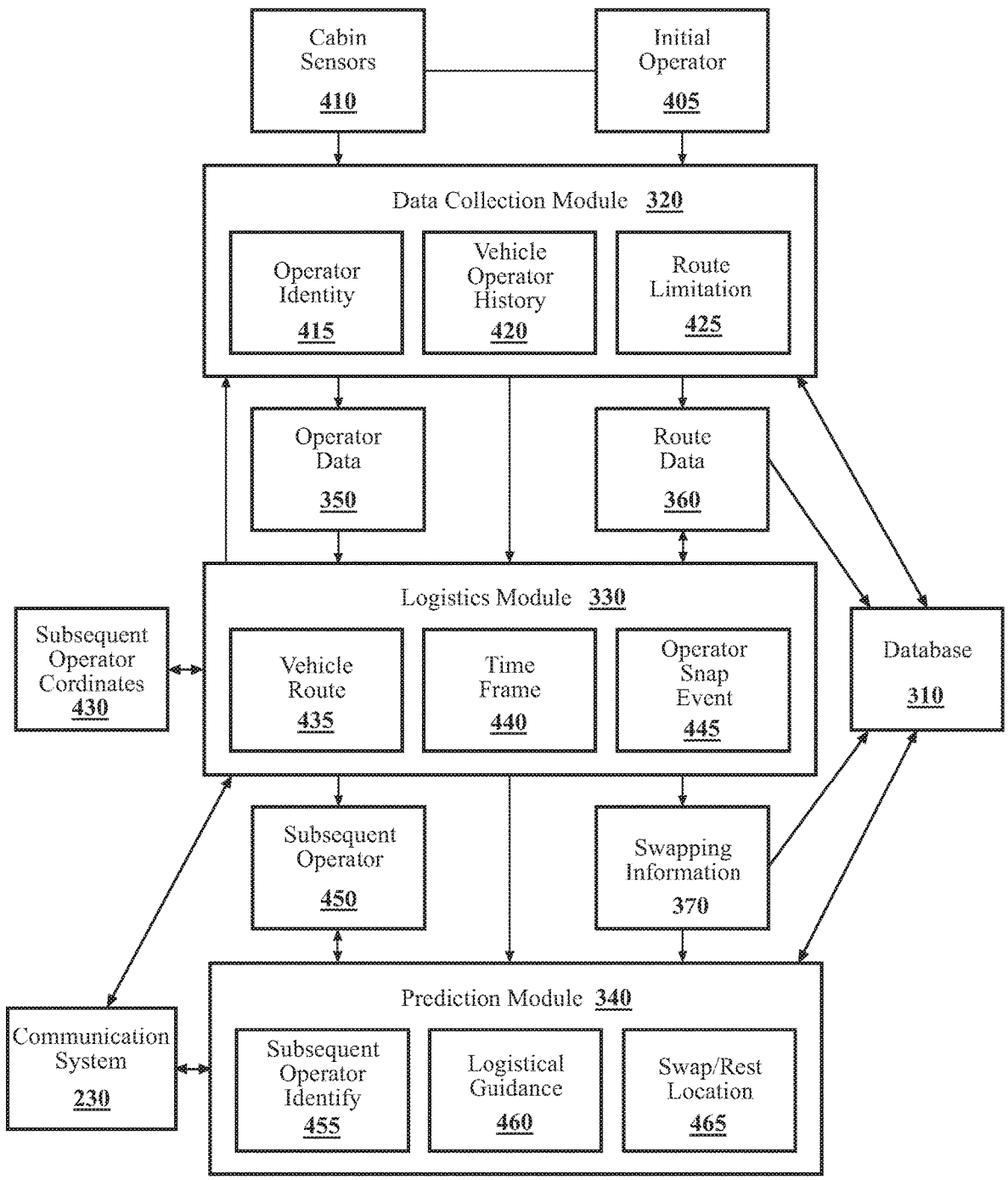
FIG. 4 is a schematic of the operator monitoring system, according to one or more implementations.

FIG. 4 is a schematic of the operator monitoring system 250, according to one or more implementations. The operator monitoring system 250 can provide for autonomous and/or interactive monitoring of the operator. The operator monitoring system 250, through one or more modules described herein, can verify the operator identity, assure operator compliance with local and federal laws regarding commercial driving, and help maintain operator rest and alertness between operator swaps. As well, the operator monitoring system 250 can help coordinate one or more operator swap events. The operator monitoring system 250 can provide logistical control of routes to assure the one or more operator swap events occur in a controlled and timely fashion. Thus, the operator monitoring system 250 through said logistical control can reduce downtime, both of the operators and of the vehicles. As well, by controlling the operator swap events, the operator monitoring system 250 can expedite delivery of important shipments by assuring that the shipments are always on the road without compromising safety.

The operator monitoring system 250 can begin with the initial operator 405. The initial operator 405 is the first operator who is operating the vehicle during a specific iteration of the operator monitoring system 250. In one or more implementations, the initial operator 405 can be the operator who is operating the vehicle at the beginning of a route. In some implementations, the initial operator 405 can present identity information to the data collection module 320. In further implementations, the data collection module 320 can interact with the cabin sensors 410 to collect information about the initial operator 405. The cabin sensors 410 can be one or more sensors which can be used to collect information from the cabin of the vehicle, such as the vehicle 200 described with reference to FIG. 2. The data collection module 320 can then determine the operator identity 415 from the initial operator 405 and/or the cabin sensors 410.

The data collection module 320 can further collect information from the database 310 regarding the vehicle operator history 420 and the route limitation 425. The vehicle operator history 420 can include information regarding the operation time and the driving history of the operator, such as how long the initial operator 405 has been operating the vehicle and the intervals of the operation. The route limitation 425 is one or more limitations which are established on the route based on rules or regulations, such as requirements for rest for the initial operator 405. Further, the data collection module 320 can collect information regarding the destination of the vehicle and/or the cargo of the initial operator 405. The operator information, including the operator identity 415 and the vehicle operator history 420, can be stored as part of the operator data 350 in the database 310. The route information, including the route limitation 425, can be stored as part of the route data 360 in the database 310. The operator data 350 and/or the route data 360 can be incorporated as part of a block in a blockchain, as described above with reference to FIG. 3.

The logistics module 330 can then apply the operator data 350 and the route data 360 to produce the logistics for coordination of vehicle operation, as part of one or more operator swap events. In some implementations, the logistics module 330 can determine or produce the vehicle route 435 and/or the timeframe 440. The vehicle route 435 is the one or more routes the vehicle is expected to travel, such that the vehicle reaches the destination. The timeframe 440 is one or more time frames set by the route limitation 425, as well as vehicle limitations such as stopping for refueling. The logistics module 330 can then apply the vehicle route 435 and the timeframe 440 in determining one or more operator swap events 445. The operator swap events 445 are planned exchanges of vehicle operation between two operators, such that the route limitation 425 are met in the vehicle can continue transit to its destination.

The logistics module 330 can select or coordinate the selection of a subsequent operator 450 from one or more subsequent operator candidates 430. The subsequent operator candidates 430, as described above, are a group of subsequent operators from which the subsequent operator 450 can be selected. The subsequent operator 450 is an operator capable of and selected for swapping with the initial operator 405 by the operator swap event 445. The vehicle route 435 and the timeframe 440 can be stored as part of the route data 360, such as in the database 310. The subsequent operator candidates 430, the operator swap event 445, and the subsequent operator 450 can be recorded or stored in the swapping information 370, such as in the database 310. The operator swap event 445, the subsequent operator 450, and other information which can be stored in the database 310, can then be forwarded or made available to the operator coordination module 340.

The operator coordination module 340 can include instructions to coordinate the operator swap between the initial operator 405 and the subsequent operator 450. The operator coordination module 340 can produce logistical guidance 460. The logistical guidance 460 is the mapping information and organizational information which can be used by the subsequent operator 450 and the initial operator 405 to complete the operator swap event 445. The logistical guidance 460 can be provided to the initial operator 405 and the subsequent operator 450 through the communication system 230. The communication system 230, as described with reference to FIG. 2, can include one or more input or output devices such that the operator monitoring system 250 can communicate with the initial operator 405 and the subsequent operator 450.

The operator coordination module 340 can use the logistical guidance 460 to guide the initial operator 405 and the subsequent operator 450 to a swap/rest location 465. The swap/rest location 465 can be a swap location for the operator swap event 445 or a rest location where the operator swap event 445 can occur. In one or more implementations, the initial operator 405 and/or the subsequent operator 450, can select the swap/rest location 465 through or by using the communication system 230. Once the initial operator 405 and the subsequent operator 450 reach the swap/rest location 465, the subsequent operator 450 can take over control of the vehicle from the initial operator 405. The operator coordination module 340 can then verify the subsequent operator identity 455 of the subsequent operator 450 in a similar manner to the verification of the operator identity 415 of the initial operator 405. During this time, the initial operator 405 can rest and await a new operator swap event 445 for a new vehicle.

Thus, the operator monitoring system 250 can use the data collection module 320 to collect information about the initial operator 405, including the operator identity 415, the vehicle operator history 420, and the route limitation 425. The operator monitoring system 250 can then, through the logistics module 330, determine the vehicle route 435, the timeframe 440, and plan for one or more operator swap events 445. Then, the operator monitoring system 250 can, through the operator coordination module 340, provide logistical guidance 460 to the initial operator 405 and the subsequent operator 450 in getting to the swap/rest location 465 for the operator swap event 445. Through the operator swap event 445, based on the timeframe 440 and the route limitation 425, the operator monitoring system 250 can assure that the initial operator 405 is alert and does not exceed driving limitations, as set by one or more regulatory bodies. Thus, the operator monitoring system 250 can assist the initial operator 405 in compliance with legal obligations, help assure the safety of the initial operator 405, and help assure the safety of the cargo within the vehicle.

Figure 5:
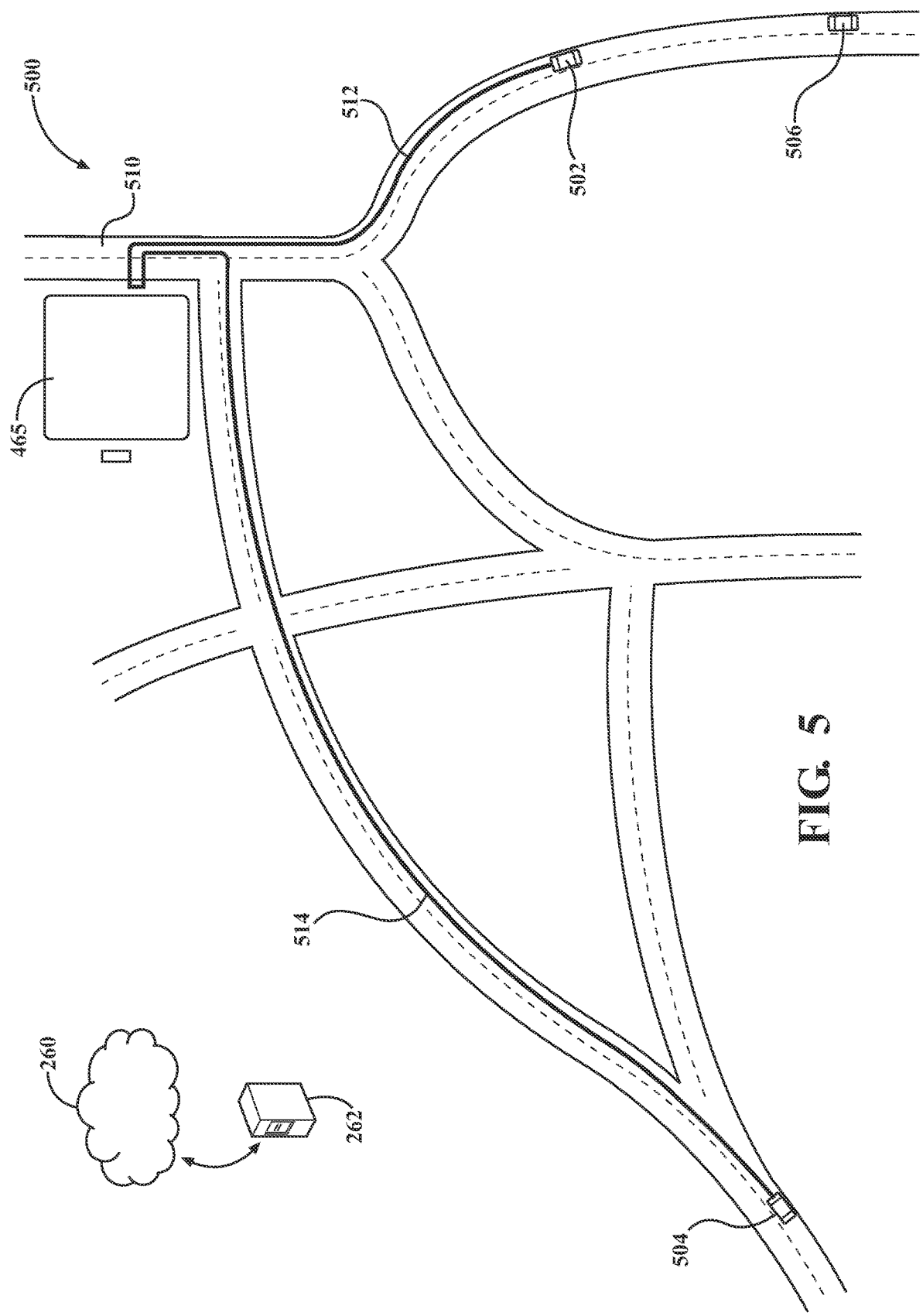
FIG. 5 is a view of a vehicular environment with one or more vehicles incorporating the operator monitoring system, according to one or more implementations.

FIG. 5 is an overhead view of one or more vehicles incorporating the operator monitoring system 250 in a vehicular environment 500, according to one or more implementations. The vehicular environment 500 is generally an environment within which a vehicle can operate. The vehicular environment 500 is shown as including a first vehicle 502, a second vehicle 504, and a third vehicle 506 as driving or otherwise operating on a transit path 510. The transit path 510 can include any type of road or surface upon which vehicles can generally travel, including highways, roads, boulevards, or others. The first vehicle 502, the second vehicle 504, and the third vehicle 506 can each include or otherwise receive instruction and/or information from the operator monitoring system 250 or components thereof. Thus, the first vehicle 502, the second vehicle 504, and the third vehicle 506 can benefit from the functions of the operator monitoring system 250 as described herein.

Figure 6:
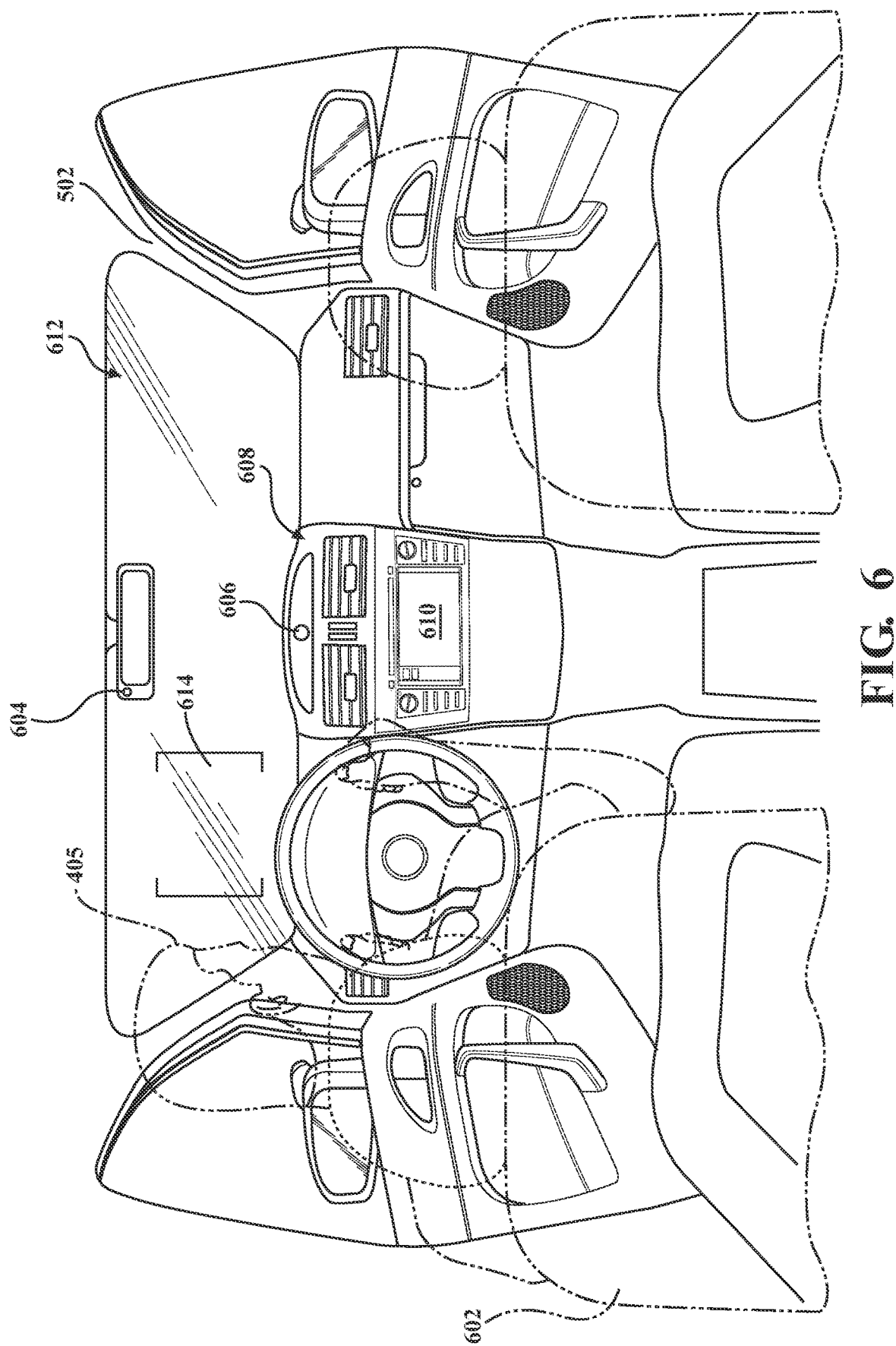
FIG. 6 is a depiction of a vehicle incorporating the operator monitoring system, according to one or more implementations.

FIG. 6 is a depiction of a vehicle incorporating the operator monitoring system, according to one or more implementations. With reference to FIGS. 2-6, the operator monitoring system 250 can begin with operator identification by the data collection module 320 in the first vehicle 502, depicted in FIG. 6. In one or more implementations, the first vehicle 502 can be substantially similar to the second vehicle 504 and/or the third vehicle 506. The first vehicle 502 is shown as including an initial operator 405 in an operator seat 602 of the first vehicle 502. The first vehicle 502 can further include one or more sensors integrated into one or more portions of the first vehicle 502, such as an image capture device 604 and a sound capture device 606. The first vehicle 502 can further include a console 608. The display 610 can be integrated into the console 608. The display 610 can be both an output and an input device, such as by providing for visual output to the initial operator 405 and accepting one or more touch responses from the initial operator 405. The first vehicle 502 can further include a windshield 612. The windshield 612 can have an augmented reality display 614 integrated therein. The augmented reality display 614 can be an integrated display in the windshield 612. The augmented reality display 614 can provide text or augmented visual input, such as visual effects appearing to be overlaid on the environment as seen from the point of view of the initial operator 405.

The data collection module 320 can begin by collecting a variety of information about the operators, as related to the vehicles and the routes. In one or more implementations, the data collection module 320 can collect information about the initial operator 405, using the image capture device 604 or the sound capture device 606. The information collected by the data collection module 320 can include initial operator identity 415 information, as well as alertness information. The data collection module 320 can further receive input from the initial operator 405 regarding the initial operator identity 415. In this example, the initial operator 405 provides a unique code through the display 610, which presents and verifies the initial operator identity 415. The data collection module 320 can then produce a block from the initial operator identity 415, and a hash for the data in the block as part of a blockchain. The block can then be forwarded to one or more devices which are part of the network 260, such as the second vehicle 504 and the third vehicle 506. The second vehicle 504 and the third vehicle 506 can then verify the hash of the block, thus establishing the validity of the block as received from the data collection module 320 through the network 260. The initial operator identity 415, as incorporated in the block, is then added to the blockchain database. The data collection module 320 can then further reference the blockchain database to determine various information such as the vehicle operator history 420 for the initial operator 405, the vehicle route 435, and route limitations 425. The data collection module 320 can then incorporate the vehicle operator history 420, the vehicle route 435, and the route limitations 425 as a block in the blockchain database.

The logistics module 330 can then make one or more logistics determinations with regards to the initial operator 405. In this example, the logistics module 330 can determine that the initial operator 405 has been driving for eleven (11) hours and must make a rest stop to remain in compliance with the route limitations 425. The logistics module 330 can then determine appropriate rest location 465 for the initial operator 405. As well, the logistics module 330 can prepare for an operator swap event 445, such that the first vehicle 502 can continue on the transit path 510 with a new operator.

The logistics module 330 can further determine that a subsequent operator 450 can take over for the initial operator 405 in operating the first vehicle 502. The logistics module 330 can then select a swap/rest location 465 using the time frame 440, the vehicle route 435, and available rest locations 465. The swap/rest location 465 can be both the rest location and the location for the operator swap event 445. As such, the swap/rest location 465 can be any number of locations where space and accommodations are available, such that the initial operator 405 can rest for the allotted time period and the subsequent operator 450 can take over operation of the first vehicle 502. The logistics module 330 can further determine that the initial operator 405, at the end of a rest period, can be part of a second operator swap event 445 with the operator of the second vehicle 504. The logistics module 330 can then forward the variety of logistics determinations, including the selected rest location 465 and the operator swap event 445, to the operator coordination module 340.

With the logistics determinations received, the operator coordination module 340 can then guide the operator swap event 445 at the swap/rest location 465. The operator coordination module 340 can forward a first route 512 to the first vehicle 502 and a second route 514 to the second vehicle 504. The first route 512 is a route selected by the operator coordination module 340 including navigational guidance and other factors such that the first vehicle 502 arrives at the swap/rest location 465 within an appropriate time frame 440 based on the route limitations 425. The first route 512 can include various navigational guidance for the initial operator 405. The first route 512 is not necessarily to scale and, based on factors such as the time frame 440 and fuel requirements of the first vehicle 502, can be over a length of time and include fueling stops. Thus, the initial operator 405 in the first vehicle 502 can proceed along the first route 512 to the swap/rest location 465. Once the first vehicle 502 arrives at the swap/rest location 465, the initial operator 405 can begin the operator swap event 445 with the subsequent operator 450. The operator monitoring system 250 can identify or receive the identification from the subsequent operator 450 in a substantially similar manner to that of the initial operator 405. The subsequent operator identification 455 can then be incorporated into a block, hashed, verified, and added to the blockchain database, as previously described.

Further, the operator coordination module 340 can act in a continuous manner coordinating further operator swap events 445, such as between the initial operator 552 405 after the allotted rest time and the second vehicle 504. The second route 514, in a similar fashion to the first route 512, is a route selected by the operator coordination module 340 including navigational guidance and other factors such that the second vehicle 504 arrives at the swap/rest location 465 for the operator swap event 445 with the initial operator 405. The second route 514 can include a route distance and timeframe 440 such that the second vehicle 504 arrives at the swap/rest location 465 at the end of the allotted rest time for the initial operator 405. In this example, the initial operator 405 becomes a subsequent operator 450 with respect to the second vehicle 504. The operator monitoring system 250 can then receive and/or collect identification information from the initial operator 405. As previously, the initial operator 405 can present a unique identifier to the operator monitoring system 250, with relation to the second vehicle 504. The operator identity 415, operator history 420, route limitations 425, and other factors as related to the initial operator 405 can then be incorporated into a block, hashed, verified, and added to the blockchain database as previously described.

Thus, the operator monitoring system 250 can help coordinate one or more operator swap events 445 between operators and vehicles, such as the first vehicle 502, the second vehicle 504, and the third vehicle 506 as shown in the vehicular environment 500.

Figure 7:
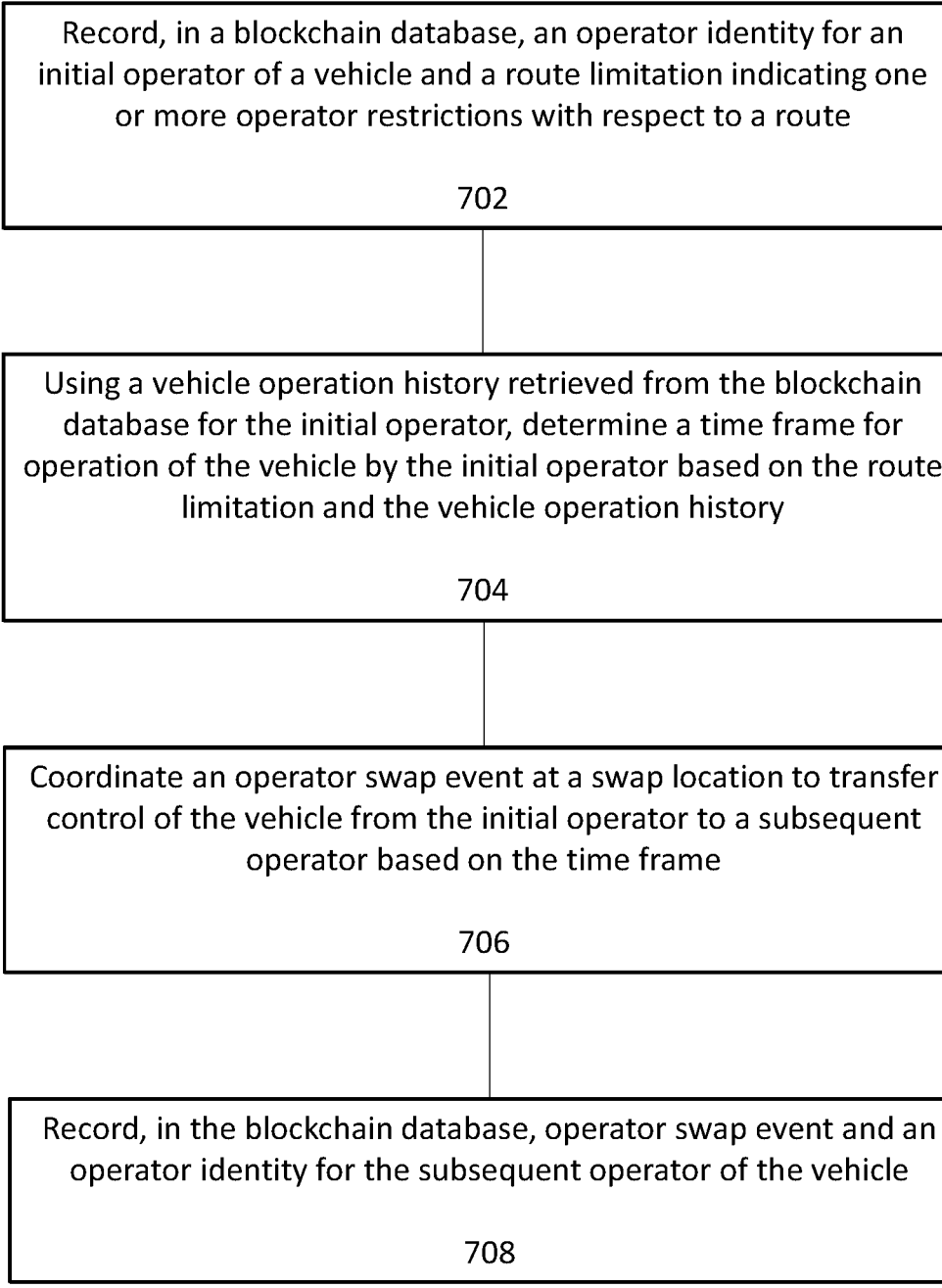
FIG. 7 is a flow diagram of a method for operator monitoring and swapping in commercial vehicles, according to one or more implementations.

Now that the various potential systems, devices, elements and/or components of arrangements herein have been described, various methods will now be described in connection with FIG. 7, which shows an example of a method 700 for operator monitoring and swapping in commercial vehicles. Various possible steps of such methods will now be described. The method 700 illustrated in FIG. 7 may be applicable to the arrangements described above in relation to FIGS. 1-6, but it is understood that the method 700 can be carried out with other suitable systems and arrangements. Moreover, the method 700 may include other steps that are not shown here, and in fact, the method 700 is not limited to including every step shown. The blocks that are illustrated here as part of the method 700 are not limited to the particular chronological order. Indeed, some of the blocks may be performed in a different order than what is shown and/or at least some of the blocks shown can occur simultaneously.

The method 700 can begin with recording an operator identity for an initial operator of a vehicle and a route limitation indicating one or more operator restrictions with respect to a route in a blockchain database, at 702. The method 700 can include collecting data related to the operators and the vehicles, for use in monitoring the operators and coordinating swap events. The data can be collected from a variety of sources, such as from the operator, preexisting in the blockchain database, secondary sources, or others. The data can then be recorded as part of an operator identity for an initial operator of a vehicle, such as a commercial vehicle. The data can include a route limitation indicating one or more operator restrictions with respect to a route in a blockchain database.

The method 700 can further include receiving or collecting an operator identity. The method 700 can include interacting with or receiving data from one or more sensors to determine when an operator has entered the vehicle. Sensors used in implementations described herein can be part of a sensor system, such as the sensor system 220, described with reference to the vehicle 200 of FIG. 2. One or more of the sensors can be directed at the cabin such that data collected is related to the operator. The method 700 can further include determining the identity of the operator using the data collected through the one or more sensors, biometric recognition (e.g., facial, retina, fingerprint, etc.), receiving an input from the operator, or others.

The method 700 can further include verifying the operator identity, such as to prevent the bypassing of rules and regulations. The verification can include a unique identifier to the operator history information as stored in the blockchain. The unique identifier, in one or more implementations, can be a specific sequence of characters, the results of an algorithm, combinations thereof, or other pieces of data, which can be used to reduce or eliminate improper identification of operators. The operator identity information and related data can then be stored as part of a blockchain. The operator identity information and related data can include information about both the operator as well as about the vehicle, such as identifying information about both the operator identity and vehicle identity. The operator identity information can then be incorporated into a block as part of the blockchain, where the resulting block received a generated verification code and is then communicated to all devices on the blockchain network.

The method 700 can further include determining a vehicle route and route limitation(s). The vehicle route is the path that the vehicle is expected to travel, as oriented to a map. The vehicle route can include one or more segments, such as for refueling or rest stops. The route limitation(s) is one or more limits set by the rules regulating commercial driving with relation to the route, as described above. In one or more implementations, the route limitations can include limitations on driving time, limitations on time of operation (e.g., time of day or night), driving interval limitations, limitations with relation to stressful driving, or others which can affect the safety of commercial driving.

The method 700 can further include instructions to retrieve a vehicle operation history from the blockchain database for the initial operator. The vehicle operation history can include information and data regarding one or more operators of the vehicle and can be limited to a specific timeframe. The method 700 can further include collecting alertness information about the initial operator, the alertness information being applied to modify the timeframe. Alertness information can generally relate to the alertness of the operator during vehicle operation, such as derived from operator gaze and eye tracking. The method 700 can include incorporating the operator identity information, the alertness information, the route limitation, and the vehicle operation history in determining timeframes and continuance of the route by the operator.

In one or more embodiments, the recording of operator identity and the vehicle identity can be included as part of a system, such as the operator monitoring system 250 described with reference to FIG. 3. The operator monitoring system 250 can include the data collection module 320. The data collection module 320 can generally include instructions that function to control the processor 304 to record an operator identity for an initial operator of a vehicle and a route limitation indicating one or more operator restrictions with respect to a route in a blockchain database. In one or more embodiments, the operator identity information and the vehicle information can be stored as blocks for distribution to members of a network and incorporation in a blockchain. The blockchain can then be stored as part of or incorporated into the database 310, as described above with reference to FIG. 3.

Then, using a vehicle operation history retrieved from the blockchain database for the initial operator, a time frame for operation of the vehicle by the initial operator can be determined based on of the route limitation and the vehicle operation history, at 704. The method 700 can include providing guidance for coordination of the operators and the related routes for one or more operator swap events. The time frame can be the length of time that the operator can continue operation of the vehicle before resting, based on legal requirements and capabilities of the operator. The method 700 can include determining the time frame based on one or more limiting conditions, such as the route limitation, alertness information, and the vehicle operation history. The method 700 can further include determining a plurality of time frames for the same route. The plurality of time frames can be configured to separate the route into segments for one or more operators. The time frame(s) can further account for the distance between rest locations, possible operator swap events, and vehicle refueling, and can be adjusted for operator-specific factors, such as the alertness information described above.

The method 700 can further include establishing an operator swap event for the initial operator based on the timeframes. The operator swap event is the exchange of an initial operator to a subsequent operator in a vehicle and the related logistics around the exchange. The operator swap event can include a selected location as well as a determination of which subsequent operator is best suited for the exchange with the initial operator. The related logistics to the operator swap event can include determination of location (e.g., a rest location) for the exchange to occur, timing of the event (e.g., to minimize downtime both for the initial operator as well as the subsequent operator), considerations for refueling, further related swap events (e.g., such as to get the initial operator back on the road after a rest period), and others.

The method 700 can further include retrieving a vehicle operation history from the blockchain database for one or more subsequent operator candidates. The method 700 can include reviewing subsequent operator candidates for exchange with the initial operator, and selected said candidates based on a variety of factors, such as proximity, availability for the entire route or portion thereof, experience level, the timing of later swap events, or others. Further, the method 700 can include receiving input from the initial operator and/or one or more subsequent operator candidates regarding the operator swap event. The method 700 can further include a selection of the subsequent operator from the one or more subsequent operator candidates based on the vehicle operation history. The vehicle operation history for the subsequent operator candidates can be substantially similar to the vehicle operation history for the initial operator. The vehicle operation history for the subsequent operator candidates can include vehicles of within a variety of time frames, the time period until the next regulated rest for the subsequent operator candidates, or others which are helpful in determining a subsequent operator from the candidates.

In one or more embodiments, the retrieving the vehicle history and time frame for the operator can be included as part of a system, such as the operator monitoring system 250 described with reference to FIG. 3. The operator monitoring system 250 can include the logistics module 330. The logistics module 330 can generally include instructions that function to control the processor 304 to, using a vehicle operation history retrieved from the blockchain database for the initial operator, determine a time frame for operation of the vehicle by the initial operator based on the route limitation and the vehicle operation history. The operator swap event and related swapping data can be stored as blocks for distribution to members of a network and incorporation in a blockchain. The blockchain can then be stored as part of or incorporated into the database 310, as in implementations of the swapping information 370, described above with reference to FIG. 3.

An operator swap event can then be coordinated at a swap location to transfer control of the vehicle from the initial operator to a subsequent operator based on the time frame, at 706. The method 700 can include providing navigational guidance and information to the operators and/or the vehicles in fulfillment of the operator swap events. As routes for each of the operators may differ, the method 700 can include modifying the routes based on the operator swap event, such that the routes of the initial operator and the subsequent operator overlap at an appropriate time frame for the operator swap event. In some implementations, the method 700 can include creating one or more modifications to the route of the initial operator and/or the subsequent operator. The one or more modifications can include the initial operator and/or the subsequent operator being directed toward a rest location. The directions can include receiving modifications of the route on a navigation device, audible cues or directions (e.g., being provided a new address), new roads and/or travel speeds (e.g., to optimize fuel consumption and adjust timing of arrival), or other factors which can be used to affect the overlap in the routes.

After arriving at the swap location and/or the rest location, the initial operator and the subsequent operator can then transfer operation of the vehicle to the subsequent operator. The method 700 can include transferring operation of the vehicle through one or more mechanisms of confirming the identity of the subsequent operator and transferring physical control of the vehicle to subsequent operator. In one or more implementations, the identity of the subsequent operator can be confirmed in a substantially similar manner to that of the identity of the initial operator, such as through the use of a physical ID and/or unique code. Transferring physical control of the vehicle generally includes transferring possession of the vehicle (e.g., allowing entry into the vehicle) and transferring the control elements of the vehicle (e.g., keys or a key dongle). Once the operator swap event is complete, the initial operator can continue on with the mandatory break or rest period.

In one or more embodiments, the coordination of the operator swap event can be included as part of a system, such as the operator monitoring system 250 described with reference to FIG. 3. The operator monitoring system 250 can include the operator coordination module 340. The operator coordination module 340 can generally include instructions that function to control the processor 304 to coordinate an operator swap event at a swap location to transfer control of the vehicle from the initial operator to a subsequent operator based on the time frame, the initial operator and the subsequent operator being navigated the swap location. The operator swap event and the identification of the subsequent operator can be stored as blocks for distribution to members of a network and incorporation in a blockchain. The blockchain can then be stored as part of or incorporated into the database 310, as in implementations of the swapping information 370, described above with reference to FIG. 3.

Then, the operator swap event and a subsequent operator identity can be recorded for the subsequent operator of the vehicle in the blockchain database, at 708. Once the operation of the vehicle has been transferred to the subsequent operator, the method 700 can include recording the transfer and the identity of the subsequent operator as part of a block. In some implementations, the subsequent operator block can then be added to the blockchain database. The subsequent operator block can further include a generated verification code. The subsequent operator block can then be forwarded to other members of the network for verification, as described above with reference to previous blocks in the blockchain database. Once the information and the verification code has been verified, the block can then be added to the respective copies of the blockchain, as controlled by the other members in the network.

In further implementations, the method 700 can include establishing an operator swap event between the initial operator and an operator of a second vehicle after the rest period. The method 700 can guide further coordination of operator swap events, such as after a rest period for the original operator. Once the rest period is complete, the original operator can then be ready to continue with the operation of another vehicle. The subsequent swap can be substantially similar to the initial swap, where the initial operator would be treated as the subsequent operator for the second vehicle. The method 700 can further include coordinating the second vehicle to the rest location for a second operator swap event. As described above, the method 700 can include providing the routing and options to one or more second operators according to the vehicle operator histories available and organizing a route for the second operator accordingly. After arriving at the rest location, the second operator can then transfer operation of the second vehicle to the initial operator (who, in relation to the second vehicle, is the subsequent operator). Thus, the operator coordination module 340 can help the initial operator maintain legal obligations regarding rest, while simultaneously minimizing operator downtime, as previously described.

In one or more embodiments, the coordination of the operator swap event can be included as part of a system, such as the operator monitoring system 250 described with reference to FIG. 3. The operator monitoring system 250 can include the operator coordination module 340. The operator coordination module 340 can generally include instructions that function to control the processor 304 to record the operator swap event and a subsequent operator identity for the subsequent operator of the vehicle in the blockchain database. The coordination of the operator swap event, identity data for the initial operator and one or more subsequent operators can be stored as blocks for distribution to members of a network and incorporation in a blockchain. The blockchain can then be stored as part of or incorporated into the database 310, as in implementations of the swapping information 370, described above with reference to FIG. 3.

FIG. 2 will now be discussed in further detail as an example vehicle environment within which the system and methods disclosed herein may operate. In some instances, the vehicle 200 can be configured to switch selectively between one or more autonomous operational modes, one or more semi-autonomous operational modes, and/or a manual operational mode. Such switching can be implemented in a suitable manner, now known or later developed. "Manual operational mode" means that all of or a majority of the navigation and/or maneuvering of the vehicle is performed according to inputs received from a user (e.g., human driver/operator). In one or more implementations, the vehicle 200 can be configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 200 along a travel route.

The vehicle 200 can include one or more processors 210. In one or more arrangements, the processor(s) 210 can be a main processor of the vehicle 200. For instance, the processor(s) 210 can be an electronic control unit (ECU). The vehicle 200 can include one or more data stores 215 for storing one or more types of data. The data store(s) 215 can include volatile and/or non-volatile memory. Examples of suitable data stores 215 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 215 can be a component of the processor(s) 210, or the data store(s) 215 can be operably connected to the processor(s) 210 for use thereby. The term "operably connected," as used throughout this description, can include direct or indirect connections, including connections without direct physical contact.

In one or more arrangements, the one or more data stores 215 can include map data 216. The map data 216 can include maps of one or more geographic areas. In some instances, the map data 216 can include information or data on roads, traffic control devices, road markings, structures, features, terrain data, and/or landmarks in the one or more geographic areas. The map data 216 can be in any suitable form. In some instances, the map data 216 can include aerial views of an area. In some instances, the map data 216 can include ground views of an area, including 360 degree ground views. The map data 216 can include measurements, dimensions, distances, and/or information for one or more items included in the map data 216 and/or relative to other items included in the map data 216. The map data 216 can include a digital map with information about road geometry. In one or more arrangement, the map data 216 can information about the ground, terrain, roads, surfaces, and/or other features of one or more geographic areas. The map data can include elevation data in the one or more geographic areas. The map data can define one or more ground surfaces, which can include paved roads, unpaved roads, land, and other things that define a ground surface. The map data 216 can be high quality and/or highly detailed.

In one or more arrangements, the one or more data stores 215 can include legal data 217. The legal data 217 can include one or more traffic rules and/or driver rules. As used herein, "traffic rule" is any law, rule, ordinance or authority that governs the operation of a motor vehicle, including instances, situations, and/or scenarios in which a motor vehicle is required to stop or reduce speed. The traffic rules can include speed limit data. The driver rules can include any law, rule, ordinance or authority that governs a human driver's operation of a motor vehicle, including commercial drivers. One example of a driver rule is a time limit on driving for a commercial driver. The legal data 217 can be international, federal, national, state, city, township and/or local laws, rules, ordinances and/or authorities.

As noted above, the vehicle 200 can include the sensor system 220. The sensor system 220 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 220 includes a plurality of sensors, the sensors can function independently from each other. Alternatively, two or more of the sensors can work in combination with each other. In such a case, the two or more sensors can form a sensor network. The sensor system 220 and/or the one or more sensors can be operably connected to the processor(s) 210, the data store(s) 215, and/or another element of the vehicle 200 (including any of the elements shown in FIG. 2). The sensor system 220 can acquire data of at least a portion of the external environment of the vehicle 200.

The sensor system 220 can include any suitable type of sensor. Various examples of different types of sensors will be described herein. However, it will be understood that the implementations are not limited to the particular sensors described. The sensor system 220 can include one or more vehicle sensors 221. The vehicle sensor(s) 221 can detect, determine, and/or sense information about the vehicle 200 itself. In one or more arrangements, the vehicle sensor(s) 221 can be configured to detect, and/or sense position and orientation changes of the vehicle 200, such as, for example, based on inertial acceleration. In one or more arrangements, the vehicle sensor(s) 221 can include one or more accelerometers, one or more gyroscopes, an inertial measurement unit (IMU), a dead-reckoning system, a global navigation satellite system (GNSS), a global positioning system (GPS), a navigation system 247, and/or other suitable sensors. The vehicle sensor(s) 221 can be configured to detect, and/or sense one or more characteristics of the vehicle 200. In one or more arrangements, the vehicle sensor(s) 221 can include a speedometer to determine a current speed of the vehicle 200.

Alternatively, or in addition, the sensor system 220 can include one or more environment sensors 222 configured to acquire, and/or sense driving environment data. "Driving environment data" includes any data or information about the external environment in which an autonomous vehicle is located or one or more portions thereof. For example, the one or more environment sensors 222 can be configured to detect, quantify and/or sense obstacles in at least a portion of the external environment of the vehicle 200 and/or information/data about such obstacles. The one or more environment sensors 222 can be configured to detect, measure, quantify and/or sense other things in the external environment of the vehicle 200, such as, for example, lane markers, signs, traffic lights, traffic signs, lane lines, crosswalks, curbs proximate the vehicle 200, off-road objects, etc.

The vehicle 200 can include one or more occupant sensors. The occupant sensor(s) can be configured to detect, determine, assess, monitor, measure, quantify and/or sense information about a vehicle driver (e.g., a vehicle driver's identity, current physiological condition, etc.). In one or more arrangements, the occupant sensor(s) can include one or more biometric identification systems, including, for example, retinal, iris, facial, palm, fingerprint, voice and/or other biometric recognition technologies to identify the current driver of the vehicle 200. The occupant sensor(s) can include a suitable camera, scanner, sensor, other hardware and/or software for retinal, iris, facial, palm, fingerprint, voice, and/or other biometric recognition, eye tracking, and other purposes. The occupant sensor(s) can include a heart rate monitor, a blood pressure monitor, a blood sugar level monitor, eye movement monitor, eyelid movement monitor, a galvanic skin response (GSR) monitor, an electroencephalograph (EEG), an electrocardiograph (ECG), an electromyograph (EMG), and/or an electronystagmograph (ENG), just to name a few possibilities.

Various examples of sensors of the sensor system 220 will be described herein. The example sensors may be part of the one or more environment sensors 222 and/or the one or more vehicle sensors 221. Moreover, the sensor system 220 can include operator sensors that function to track or otherwise monitor aspects related to the driver/operator of the vehicle 200. However, it will be understood that the implementations are not limited to the particular sensors described. As an example, in one or more arrangements, the sensor system 220 can include one or more radar sensors 223, one or more LIDAR sensors 224, one or more sonar sensors 225, and/or one or more cameras 226.

The vehicle 200 can further include a communication system 230. The communication system 230 can include one or more components configured to facilitate communication between the vehicle 200 and one or more communication sources. Communication sources, as used herein, refers to people or devices with which the vehicle 200 can communicate with, such as external networks, computing devices, operator or occupants of the vehicle 200, or others. As part of the communication system 230, the vehicle 200 can include an input system 231. An "input system" includes any device, component, system, element or arrangement or groups thereof that enable information/data to be entered into a machine. In one or more examples, the input system 231 can receive an input from a vehicle occupant (e.g., a driver or a passenger). The vehicle 200 can include an output system 232. An "output system" includes any device, component, or arrangement or groups thereof that enable information/data to be presented to the one or more communication sources (e.g., a person, a vehicle passenger, etc.). The communication system 230 can further include specific elements which are part of or can interact with the input system 231 or the output system 232, such as a display device 233, and one or more audio devices 234 (e.g., speakers and microphones).

The vehicle 200 can include one or more vehicle systems 240. Various examples of the one or more vehicle systems 240 are shown in FIG. 2. However, the vehicle 200 can include more, fewer, or different vehicle systems. It should be appreciated that although particular vehicle systems are separately defined, each or any of the systems or portions thereof may be otherwise combined or segregated via hardware and/or software within the vehicle 200. The vehicle 200 can include a propulsion system 241, a braking system 242, a steering system 243, throttle system 244, a transmission system 245, a signaling system 246, and/or a navigation system 247. Each of these systems can include one or more devices, components, and/or combinations thereof, now known or later developed.

The processor(s) 210 can be operably connected to communicate with the various vehicle systems 240 and/or individual components thereof. For example, returning to FIG. 2, the processor(s) 210 can be in communication to send and/or receive information from the various vehicle systems 240 to control the movement, speed, maneuvering, heading, direction, etc. of the vehicle 200. The processor(s) 210 and/or the operator monitoring system 250 may control some or all of these vehicle systems 240.

The modules described herein can be implemented as computer-readable program code that, when executed by a processor, implement one or more of the various processes described herein. The processor can be a device, such as a CPU, which is capable of receiving and executing one or more threads of instructions for the purpose of performing a task. One or more of the modules can be a component of the processor(s), or one or more of the modules can be executed on and/or distributed among other processing systems to which the processor(s) is operably connected. The modules can include instructions (e.g., program logic) executable by one or more processor(s). Alternatively, or in addition, one or more data stores may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A vehicle having a system for operator monitoring and swapping in commercial vehicles, the system comprising:
   one or more processors, the one or more processors being programmed to initiate executable operations comprising:
      recording, in a blockchain database, an operator identity for an initial operator of the vehicle and a route limitation indicating one or more operator restrictions with respect to a route;
      using a vehicle operation history retrieved from the blockchain database for the initial operator, determining a time frame and a vehicle route for operation of the vehicle by the initial operator, based on the route limitation and the vehicle operation history, to be at a swap location;
      collecting alertness information relating to decreases in attention span and operator exhaustion for the initial operator;
      modifying the route limitation with respect to one or more alertness capabilities of the initial operator as predicted from the alertness information;
      determining another time frame and another vehicle route for operation of another vehicle by another operator to be at the swap location at an end of a rest interval for the initial operator;
      automatically causing, via a communications system of the vehicle and in response to a determination of the other time frame and the other vehicle route for operation of the other vehicle by the other operator to be at the swap location at the end of the rest interval for the initial operator, the other time frame and the other vehicle route to be communicated to the other vehicle;
      coordinating a first operator swap event at the swap location to transfer control of the vehicle from the initial operator to a subsequent operator based on the time frame, wherein the initial operator and the subsequent operator are navigated to the swap location;
      coordinating a second operator swap event at the swap location to transfer control of the other vehicle from the other operator to the initial operator; and
      recording, in the blockchain database, the first operator swap event and a subsequent operator identity for the subsequent operator of the vehicle.

2. The system of claim 1, wherein the executable operations further include:
   retrieving the vehicle operation history including operation time with respect to the route limitation from the blockchain database for the initial operator.

3. The system of claim 1, wherein the executable operations further include:
   selecting the swap location; and
   determining the rest interval for the initial operator.

4. The system of claim 3, wherein the executable operations further include:
   providing a selection of possible swap locations to the initial operator, wherein the swap location is selectable by the initial operator.

5. The system of claim 1, wherein the executable operations further include:
   retrieving a vehicle operation history from the blockchain database for one or more subsequent operator candidates, and
   selecting the subsequent operator from the one or more subsequent operator candidates with respect to the route limitation.

6. The system of claim 5, wherein the executable operations further include:
   selecting the subsequent operator from the one or more subsequent operator candidates by comparing the route limitation to a desired work frequency and a shift destination for each of the subsequent operator candidates.

7. A non-transitory computer-readable medium for operator monitoring and swapping in commercial vehicles, the non-transitory computer-readable medium storing instructions that when executed by one or more processors cause the one or more processors to:
   record, in a blockchain database, an operator identity for an initial operator of a vehicle and a route limitation indicating one or more operator restrictions with respect to a route;
   using a vehicle operation history retrieved from the blockchain database for the initial operator, determine a time frame and a vehicle route for operation of the vehicle by the initial operator, based on the route limitation and the vehicle operation history, to be at a swap location;
   collect alertness information relating to decreases in attention span and operator exhaustion for the initial operator;
   modify the route limitation with respect to one or more alertness capabilities of the initial operator as predicted from the alertness information;

determine another time frame and another vehicle route for operation of another vehicle by another operator to be at the swap location at an end of a rest interval for the initial operator;

automatically cause, via a communications system of the vehicle and in response to a determination of the other time frame and the other vehicle route for operation of the other vehicle by the other operator to be at the swap location at the end of the rest interval for the initial operator, the other time frame and the other vehicle route to be communicated to the other vehicle;

coordinate a first operator swap event at the swap location to transfer control of the vehicle from the initial operator to a subsequent operator based on the time frame, wherein the initial operator and the subsequent operator are navigated to the swap location;

coordinate a second operator swap event at the swap location to transfer control of the other vehicle from the other operator to the initial operator; and record the first operator swap event and a subsequent operator identity for the subsequent operator of the vehicle in the blockchain database.

8. The non-transitory computer-readable medium of claim 7, wherein the instructions to coordinate the first operator swap event further comprise instructions to select the swap location and a to determine the rest interval for the initial operator.

9. The non-transitory computer-readable medium of claim 8, further comprising instructions to provide a selection of possible swap locations to the initial operator, wherein the swap location is selectable by the initial operator.

10. The non-transitory computer-readable medium of claim 7, further comprising instructions to retrieve a vehicle operation history from the blockchain database for one or more subsequent operator candidates, and to select the subsequent operator from the one or more subsequent operator candidates with respect to the route limitation.

11. The non-transitory computer-readable medium of claim 10, further comprising instructions to select the subsequent operator from the one or more subsequent operator candidates by comparing the route limitation to a desired work frequency and a shift destination for each of the subsequent operator candidates.

12. A method for operator monitoring and swapping in a commercial vehicle, comprising:

recording, in a blockchain database, an operator identity for an initial operator of a vehicle and a route limitation indicating one or more operator restrictions with respect to a route;

using a vehicle operation history retrieved from the blockchain database for the initial operator, determining a time frame and a vehicle route for operation of the vehicle by the initial operator, based on the route limitation and the vehicle operation history, to be at a swap location;

collecting alertness information relating to decreases in attention span and operator exhaustion for the initial operator;

modifying the route limitation with respect to one or more alertness capabilities of the initial operator as predicted from the alertness information;

determining another time frame and another vehicle route for operation of another vehicle by another operator to be at the swap location at the an end of a rest interval for the initial operator;

automatically causing, via a communications system of the vehicle and in response to a determination of the other time frame and the other vehicle route for operation of the other vehicle by the other operator to be at the swap location at the end of the rest interval for the initial operator, the other time frame and the other vehicle route to be communicated to the other vehicle;

coordinating a first operator swap event at the swap location to transfer control of the vehicle from the initial operator to a subsequent operator based on the time frame, wherein the initial operator and the subsequent operator are navigated to the swap location;

coordinating a second operator swap event at the swap location to transfer control of the other vehicle from the other operator to the initial operator; and recording, in the blockchain database, the first operator swap event and a subsequent operator identity for the subsequent operator of the vehicle.

13. The method of claim 12, wherein coordinating the first operator swap event includes selecting the swap location and determining the rest interval for the initial operator.

14. The method of claim 13, further comprising providing a selection of possible swap locations to the initial operator, wherein the initial operator selects the swap location.

15. The method of claim 12, further comprising retrieving a vehicle operation history from the blockchain database for one or more subsequent operator candidates, and selecting the subsequent operator from the one or more subsequent operator candidates with respect to the route limitation.

16. The method of claim 15, further comprising selecting the subsequent operator from the one or more subsequent operator candidates by comparing the route limitation to a desired work frequency and a shift destination for each of the subsequent operator candidates.

* * * * *